(12) United States Patent
Sohn et al.

(10) Patent No.: US 6,999,513 B2
(45) Date of Patent: Feb. 14, 2006

(54) APPARATUS FOR ENCODING A MULTI-VIEW MOVING PICTURE

(75) Inventors: Kwang Hoon Sohn, Seoul (KR); Jeong Eun Lim, Seoul (KR); Byeong Ho Choi, Osan-si (KR); Je Woo Kim, Seoul (KR); Hyeok Koo Jung, Pyeongtaek-si (KR)

(73) Assignee: Korea Electronics Technology Institute, (KR)

( * ) Notice: Subject to any disclaimer, the term of this patent is extended or adjusted under 35 U.S.C. 154(b) by 665 days.

(21) Appl. No.: 10/246,262

(22) Filed: Sep. 17, 2002

(65) Prior Publication Data

US 2003/0202592 A1    Oct. 30, 2003

(30) Foreign Application Priority Data

Apr. 20, 2002    (KR) .............................. 2002-21757

(51) Int. Cl.
 *H04N 7/12*    (2006.01)
(52) U.S. Cl. ................................. 375/240.16
(58) Field of Classification Search ................. None
See application file for complete search history.

(56) References Cited

U.S. PATENT DOCUMENTS

| 6,055,012 | A  | * | 4/2000  | Haskell et al. | ................. 348/48 |
| 6,144,701 | A  | * | 11/2000 | Chiang et al.  | ................. 375/240 |
| 6,151,362 | A  | * | 11/2000 | Wang           | ................. 375/240.12 |
| 6,377,625 | B1 | * | 4/2002  | Kim            | ................. 375/240.08 |

* cited by examiner

*Primary Examiner*—Nhon Diep
(74) *Attorney, Agent, or Firm*—Anderson Kill & Olick, PC

(57) ABSTRACT

A disparity prediction stage and a motion prediction stage predict a disparity vector and a motion vector by extending a MPEG-2 structure into a view axis and using spatial/temporal correlation. A disparity/motion compensation stage compensates an image reconstructed by the disparity prediction stage and the motion prediction stage by using a sub-pixel compensation method. A residual image encoding stage performs an encoding to provide a better visual quality and a three-dimensional effect of an original image and the reconstructed image. A bit rate control stage controls a bit rate for assigning an effective amount of bit to each frame on the reconstructed image according to a bit rate. An entropy encoding stage generates a bit stream on multi-view video source data according to the bit rate.

14 Claims, 7 Drawing Sheets

APPARATUS FOR ENCODING A MULTI-VIEW MOVING PICTURE

FIELD OF THE INVENTION

The present invention relates to an apparatus for encoding a multi-view moving picture; and, more particularly, to an apparatus for encoding a multi-view moving picture, which is able to implement a preprocessing technique such as a noise elimination and an imbalancing problem-solution and an actual system employing compressed algorithm for minimizing an amount of information on a multi-view video.

BACKGROUND OF THE INVENTION

Normally, a medium for a visual information transmission has been developed from a two-dimensional terminal such as a television set. In other words, a black-and-white image has developed into a color image, i.e., a standard definition television set has developed into a high definition television set (e.g., HDTV). Therefore an amount of visual information data tends to be increased.

Since current visual information is not two-dimensional, but three-dimensional, a development of a technology related to three-dimensional visual information is needed in order to transmit reality and natural multimedia information.

To describe in detail, FIG. 1 shows an encoder and a decoder of a multi-view profile, which are implemented by applying a time scalability of a moving picture experts group 2 (MPEG-2) standard.

The scalability provided by the MPEG-2 is for simultaneously decoding images having different resolutions and types by using one image-processing device. The time scalability among scalabilities supported by the MPEG-2 is a technique for improving a visual quality by increasing a frame rate. The multi-view profile is applied to a stereo sequences by considering the time scalability.

In fact, a structure of a stereo encoder and decoder applying the stereo sequences is similar to a structure applying the time scalability as shown in FIG. 1. Left view sequences among the stereo sequences are input into a base view encoder 110, and right view thereof is input into a temporal auxiliary view encoder 100.

The temporal auxiliary view encoder 100 for the time scalability is an interlayer encoder for interleaving images between images of a base layer.

Therefore, if the left view is separately encoded and decoded, a two-dimensional moving picture can be obtained from this system. If the left view and the right view are simultaneously encoded and decoded, a stereo sequences can be implemented. Here, in order to transmit or store the moving picture, a system multiplexer 120 and a system demultiplexer 130 are needed for combining or separating sequences of two images.

FIG. 2 illustrates a stereo moving picture encoder/decoder using a MPEG-2 multi-view profile (MVP).

The image of the base layer is encoded by using a motion compensation and a discrete cosine transform (DCT). The encoded image is decoded through an inverse process. The temporal auxiliary view encoder 100 takes the role of a temporal interlayer encoder predicted based on the decoded image of the base layer.

Generally, two disparity compensated predictions, or one disparity and one motion compensated prediction may be used in this case. The temporal auxiliary view encoder includes disparity and motion compensated DCT encoder and decoder as the encoder and decoder of the base layer does.

Further, a disparity compensated encoding process needs a disparity predictor and a compensator as a motion prediction/compensation encoding process needs a motion predictor and a compensator. In addition to a block-based motion/disparity prediction and compensation, the encoding process includes the DCT of a differential value between a predicted image and an original image, a residual image, a quantization of a DCT coefficient and a variable length encoding. On the contrary, a decoding process is constituted with a variable length decoding, an inverse quantizaiton and an inverse DCT.

The MPEG-2 encoding is a very effective compression method because of a bidirectional motion prediction for a bidirectionally motion-compensated pictures (B-pictures). Also, since the MPEG-2 encoding has very effective time scalability, a high efficient compression can be obtained by employing the B-pictures using bidirectional motion prediction to encode a right view.

FIG. 3 describes a predictive encoding considering only time difference by using two disparity predictions for the bi-directional motion prediction. A left image in the left view is encoded by using a non-scalable MPEG-2 encoder, and a right image in the right view is encoded by using a MPEG-2 temporal auxiliary view encoder based on the decoded left image.

In other words, the right image is encoded into the B-picture by using the prediction obtained from two reference images, e.g., left images. In this case, one of the two reference images is a left image to be simultaneously displayed, and the other is a left image to be temporally followed by.

Two predictions have three prediction modes as the motion estimation/compensation does: a forward, a backward and an interpolated mode. In the forward mode, a disparity predicted from an isochronal left image is obtained, and, in the backward mode, a disparity predicted from a very next left image is obtained. In this case, a prediction of a right image is performed through disparity vectors of the two left images, and such kind of prediction method is called a predictive encoding considering only disparity vectors. Therefore, the encoder estimates two disparity vectors on each frame of a right image, and the decoder decodes the right image from the left image by using the two disparity vectors.

In FIG. 4, a B-picture is obtained based on the bidirectional prediction scheme illustrated in FIG. 3, but using one disparity estimation and one motion estimation. That is, one uses the disparity prediction from an isochronal left image and the motion prediction from a previous right image in the right view.

Further, the bidirectional prediction also includes three prediction modes, called a forward, a backward and an interpolated mode, as in a prediction encoding considering only a disparity does. Here, the forward mode means a motion prediction from the decoded right image, and the backward mode means a disparity prediction from the decoded left image.

As described above, the MPEG-2 multi-view profile (MVP) itself is designed suitable for the stereo moving picture without considering an encoder structure for the multi-view moving picture, therefore, an encoder for providing a multi-view moving picture is needed in order to simultaneously provide a three-dimensional effect and reality to many people.

Further, the MPEG-2 suggests a standard on encoding and decoding of a moving picture. That is, as illustrated in FIG. 5, a picture type specified by the MPEG-2 is categorized into three: an intra coded picture (I picture), a predictive coded picture (P picture) and a bidirectionally predictive coded picture (B picture). The I picture is encoded by performing DCT without using the motion estimation/compensation process. The P picture is encoded by performing DCT on difference data after performing the motion estimation/compensation by referring to the I picture or another P picture. The B picture uses the motion compensation as the P picture does, but performs motion estimation/compensation from two frames on a time axis.

The picture sequence of the MPEG-2 has a structure, e.g., B, B, I, B, B, P, . . . , and a set of picture from an I picture to a next I picture is called a group of pictures (GOP). The number of pictures in the GOP is designated as N, and the number of pictures between two neighboring I and P pictures or between two neighboring P pictures is designated as M.

Since the MPEG-2 is a standard for encoding and decoding a single-view moving picture, it does not define an encoder for a multi-view moving picture. Further, though the MPEG-2 provides the MVP for extending a single view moving picture into a stereo type moving picture, it still does not support an encoder for extending a single view or stereo moving picture into a multi-view moving picture.

SUMMARY OF THE INVENTION

It is, therefore, an object of the present invention to provide an apparatus for encoding a multi-view moving picture, which is able to implement a preprocessing technique such as a noise elimination and an imbalancing problem-solution and a real system employing compressed algorithm for minimizing information on a multi-view video.

In accordance with the present invention, there is provided an apparatus for encoding multi-view video source data, including a preprocessing stage, when multi-view video source data is input, for eliminating from the input data a noise and solving an imbalancing problem; a disparity prediction stage and motion prediction stage for estimating a disparity vector and a motion vector, respectively, on the basis of a moving picture axis including an I picture; a disparity/motion compensation stage for compensating an image predicted by the disparity and the motion estimation stages by using a sub-pixel compensation technique; a residual image encoding stage for receiving an original picture from the preprocessing stage and a reconstructed picture provided from the disparity/motion compensation stage and performing a residual image encoding process in order to improve a picture quality and enhance a three-dimensional effect of the picture; a bit rate control stage for controlling a bit rate for each frame in the reconstructed picture encoded by the residual image encoding stage; and an entropy encoding stage for generating bit streams for the multi-view moving picture source data according to the bit rates controlled by the bit rate control stage.

BRIEF DESCRIPTION OF THE DRAWINGS

The above and other object and features of the present invention will become apparent from the following description of preferred embodiments, given in conjunction with the accompanying drawings, in which.

DETAILED DESCRIPTION OF THE PREFERRED EMBODIMENTS

Preferred embodiments of the present invention will be described in detail with reference to the accompanying drawings.

Figure 1:
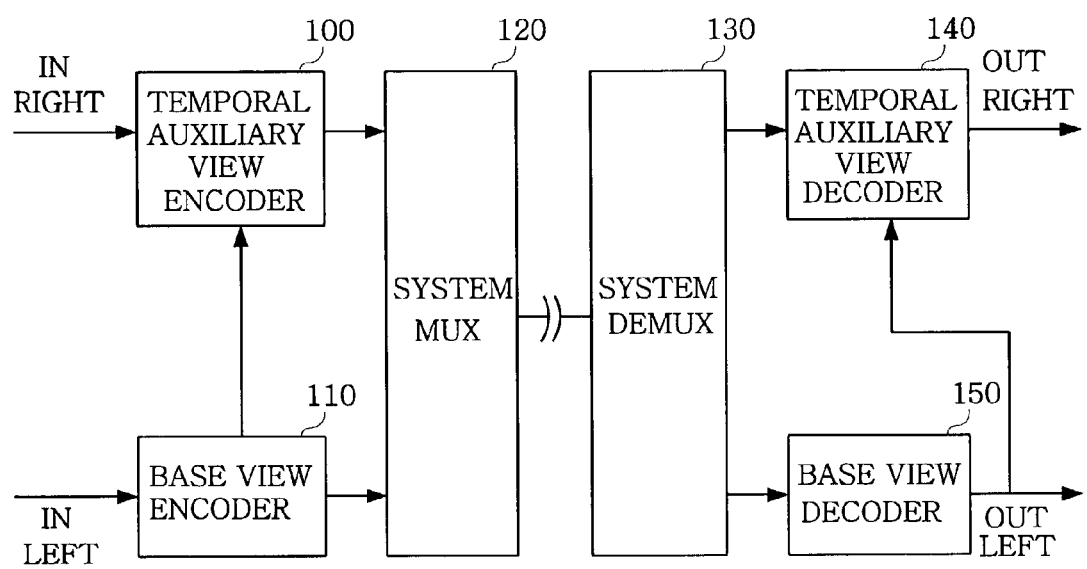
FIG. 1 shows an encoder and a decoder of MPEG-2 multi-view profile (MVP)
Figure 2:
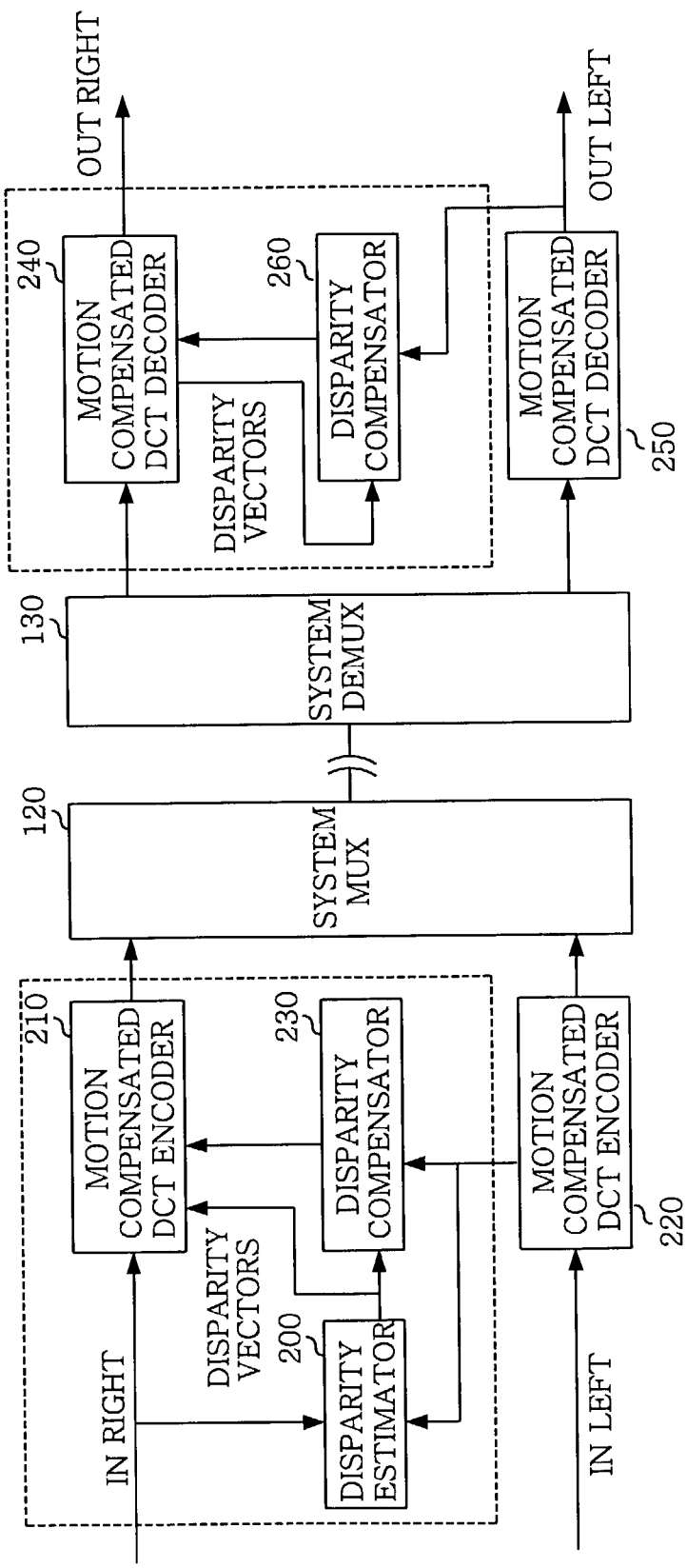
FIG. 2 illustrates a stereo moving picture encoder and a decoder using the MPEG-2 MVP.
Figure 3:
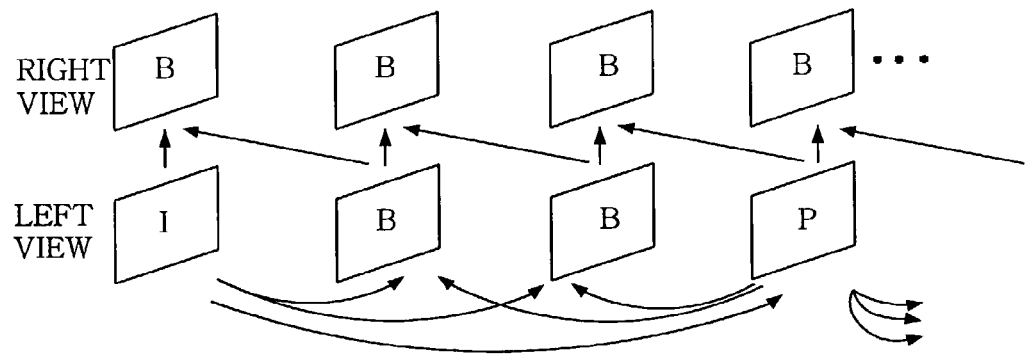
FIG. 3 describes a predictive encoding using two disparity predictions for a bidirectional prediction.
Figure 4:
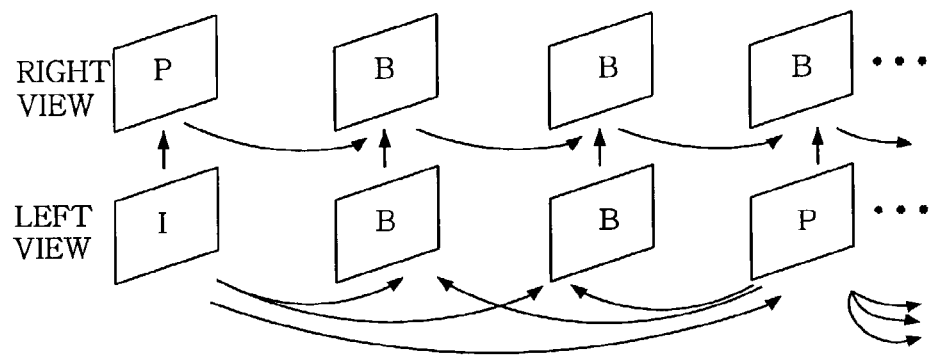
FIG. 4 presents a predictive encoding using a disparity vector and a motion vector for the interpolated prediction.
Figure 5:
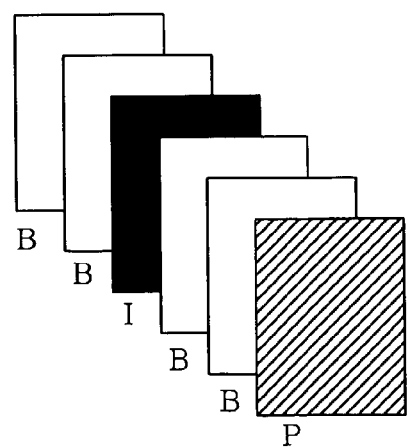
FIG. 5 represents a picture type specified by the MPEG-2.
Figure 6:
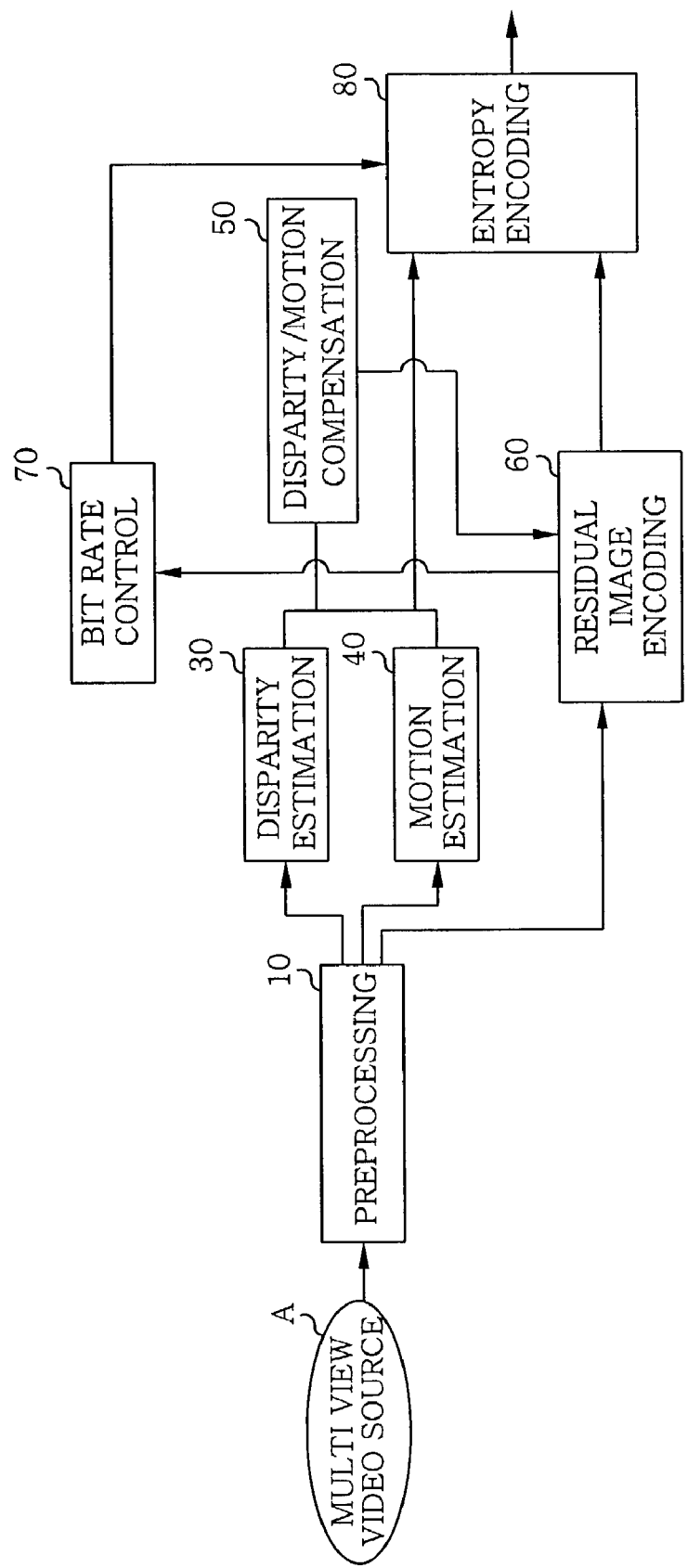
FIG. 6 is a block diagram of an apparatus for encoding multi-view moving pictures in accordance with the present invention.

FIG. 6 is a block diagram of a multi-view moving picture encoding apparatus in accordance with a first embodiment of the present invention. The encoding apparatus includes a preprocessing stage 10, a disparity estimation stage 30, a motion estimation stage 40, a disparity/motion compensation stage 50, a residual image encoding stage 60, a bit rate control stage 70 and an entropy encoding stage 80.

When multi-view video source (A) data is input, the preprocessing stage 10 eliminates from the input data a noise and solves an imbalancing problem. To be specific, the imbalancing problem is solved by way of using a mean and a dispersion value of a reference frame and a frame to be encoded. The noise can be removed by using a median filter. Increased through such a preprocessing process is a correlation between the multi-view video source (A) data, which in turn improves a reliability of vectors to be obtained from a disparity estimation and a motion estimation process to be performed later. After undergoing through the preprocessing stage 10, the multi-view video source (A) data is sent to the disparity estimation stage 30, the motion estimation stage 40 and the residual image encoding stage 60.

Figure 7:
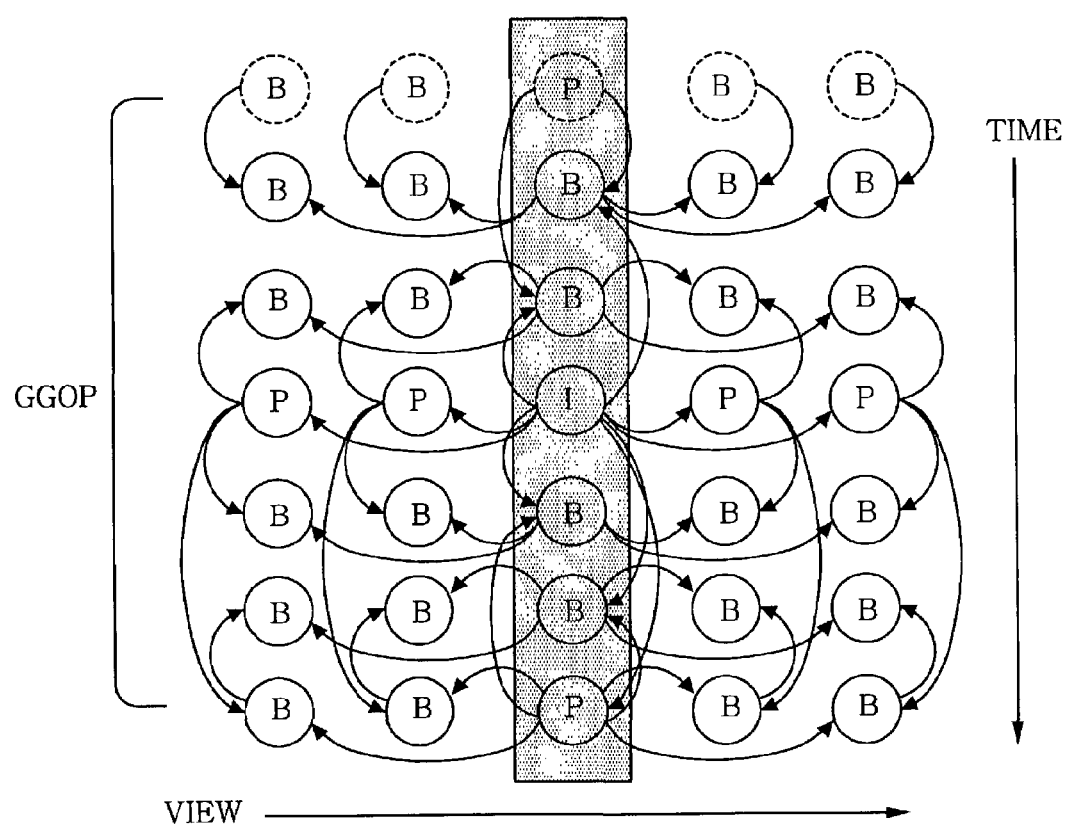
FIG. 7 depicts a multi-view moving picture encoding structure in accordance with a preferred embodiment of the present invention.
Figure 8:
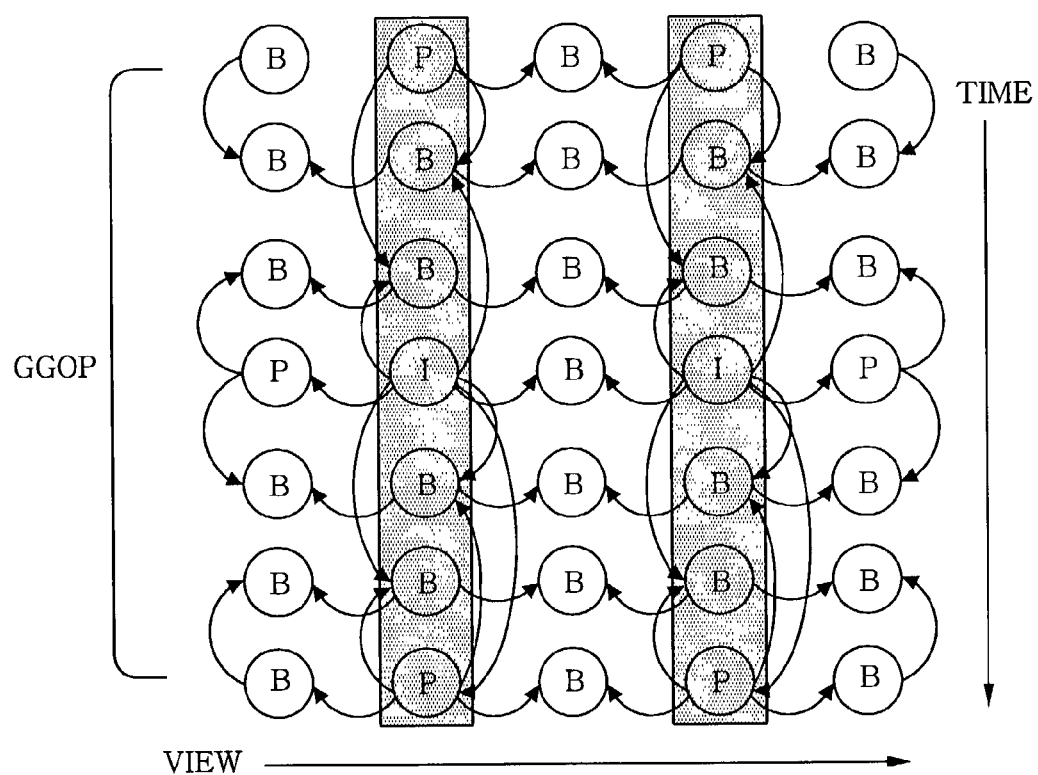
FIG. 8 offers a multi-view moving picture encoding structure in accordance with another preferred embodiment of the present invention.
Figure 9:
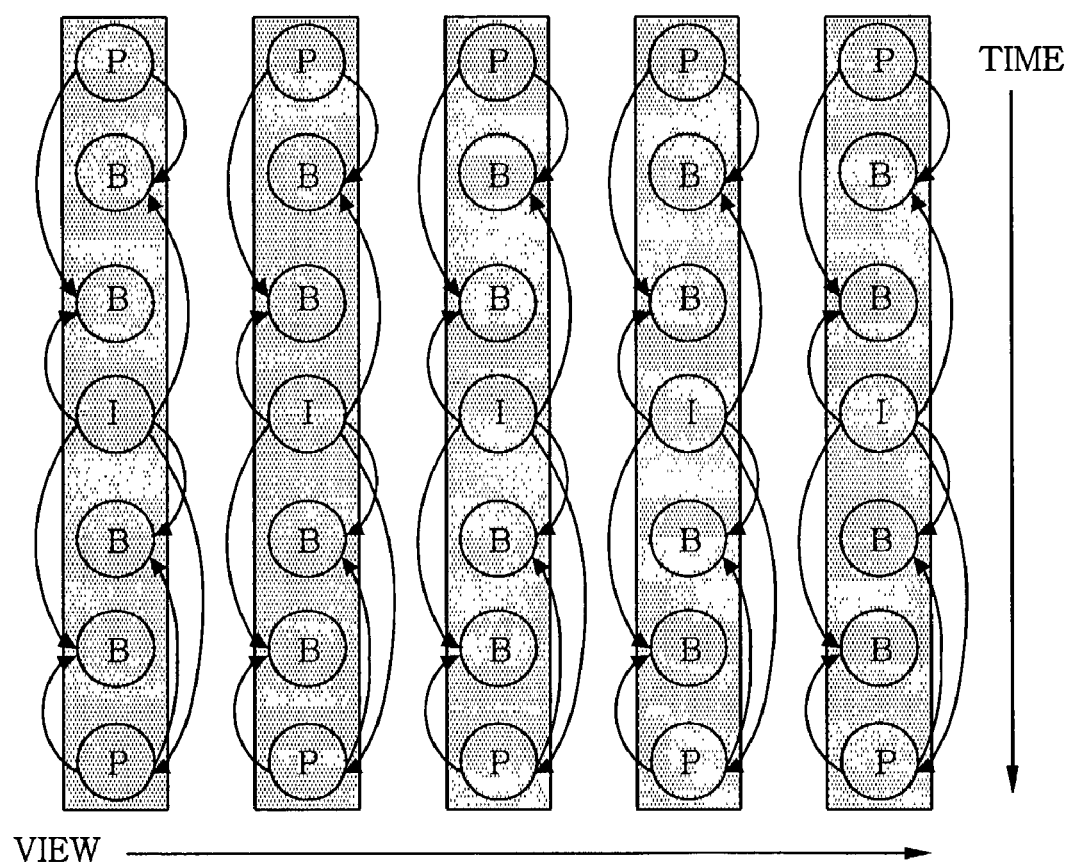
FIG. 9 provides a multi-view moving picture encoding structure in accordance with still another preferred embodiment of the present invention.

The disparity estimation stage 30 and the motion estimation stage 40 estimate a disparity vector and a motion vector, respectively, in directions marked by arrows illustrated in FIG. 7 to FIG. 9 on the basis of a moving picture axis including an I picture. Thus estimated disparity vector and the motion vector are provided to the disparity/motion compensation stage 50.

The disparity/motion compensation stage 50 compensates an image expected by the disparity and the motion estimation stages 30 and 40 by using a sub-pixel compensation technique, and, then, provides the compensated image to the residual image encoding stage 60.

When the disparity and the motion estimation stages 30 and 40 and the disparity/motion compensation stage 50 are operated, an estimation direction is set by using both multi-view disparity vectors and motion vectors. That is, a spatial/temporal correlation between the pictures can be effectively utilized by introducing the multi-view concept to the MPEC-2 encoding technology.

The residual image encoding stage 60 receives the original picture from the preprocessing stage 10 and the reconstructed picture provided from the disparity/motion compensation stage 50 and performs a residual image encoding process in order to improve a picture quality and enhance a three-dimensional effect of the picture. The result from the residual image encoding stage 60 is offered to the bit rate control stage 70.

Then, the bit rate control stage 70 controls a bit rate for each frame in the reconstructed picture encoded by the residual image encoding stage 60. Then, after bit rate controlled, picture data is provided to the entropy encoding stage 80. Specifically, the bit rate is controlled by employing a MPEC-2 bit rate control technique. In a structure having one I picture in a group GOP (GGOP), the bit rate control is performed by regarding the GGOP as a single GOP. In a structure having two I pictures within a single GGOP, on the other hand, the bit rate control is performed by dividing the GGOP into two parts, each having one I picture, and considering each of the two parts as an individual GOP. In a structure having five I pictures, the bit rate control is performed by considering there exist five MPEC-2 streams.

The entropy encoding stage 80 generates bit streams for the multi-view moving picture source (A) data according to the bit rates controlled by the bit rate control stage 70.

The bit streams of the multi-view moving picture source (A) data are described as follows. As shown in FIGS. 7 to 9, the bit stream of a view including an I picture is set to have the same structure as the MPEC-2 bit stream whereas the bit streams of the views having no I picture are set to include additional data for processing the multi-view moving picture.

Bit streams generated by the multi-view moving picture encoding apparatus shown in FIG. 6 is composed of a main MPEC-2 bit stream and auxiliary bit streams. The main MPEC-2 bit stream is generated for the compatibility with the MPEC-2 technique and the auxiliary bit streams include the multi-view moving picture data.

The main MPEC-2 bit stream includes a sequence layer having the MPEC-2 data structure, a GOP layer, a picture layer, a slice layer, a macro layer and a block layer. The auxiliary bit stream includes a GGOP layer containing information on the location and the number of I pictures, motion vectors and disparity vectors of the views having no I picture, residual image encoding data and other additional information.

The multi-view moving picture source (A) data is additionally inserted into a sequence header, a sequence extension header, a picture header and a picture extension header of the MPEC-2 structure. A constrained parameters flag is set in the sequence header in order to distinguish the multi-view moving picture data from the MPEC-2 data.

The constrained parameters flag has been conventionally employed to distinguish a MPEC-2 data structure from a MPEC-1 structure. However, in the multi-view moving picture encoding apparatus of the present invention, the constrained parameters flag is used to determine whether the encoded data is a multi-view moving picture or a MPEC-2 moving picture. If the flag is set to be '0', it means that the involved data is a multi-view moving picture whereas if the flag is set to be '1', it implies that the involved data is a MPEC-2 moving picture.

Inserted into the sequence extension header are a view number flag for representing the number of views of a multi-view moving picture and a reference frame number flag for indicating the number of I pictures.

Further inserted into the sequence extension header are a reference frame position flag for specifying the position of the I picture in terms of the view and the time axes and a picture coding type for indicating the encoding type for a picture. The picture coding types are the same as those described in the MPEC-2 standard. In the cases of P and B pictures, however, additionally inserted into the sequence extension header is information for determining whether the P or B pictures are encoded by using motion vectors, disparity vectors or both.

In other words, even for the P picture, it should be clarified whether the P picture is encoded by using a disparity vector or a motion vector.

A search range for the disparity vector is set in the picture extension header where a search range for the motion vector is already set. Specifically, inserted into the picture extension header are a disparity horizontal code flag for defining a horizontal search range for the disparity vector and a disparity vertical code flag for specifying a vertical search range for the disparity vector.

FIGS. 7 and 8 are designed in order to effectively apply the multi-view moving picture according to a difference of disparity vector generated by a camera parameter for obtaining the multi-view moving picture. FIG. 7 is used for a multi-view moving picture structure having a small disparity vector and FIG. 8 is used for a multi-view moving picture structure having a big disparity vector so that an error caused by a disparity vector estimation process may be decreased.

The present invention can provide reality to an observer by implementing a preprocessing technique such as a noise elimination and an imbalancing problem-solution and a real system employing compressed algorithm for minimizing an amount of information on a multi-view video, i.e., an encoding system by adding a three-dimensional effect to a conventional two-dimensional video signal. Also, since the present invention has compatibility with a MPEG-2 standard, it is easy to be introduced to a video market. Further, by a combination with a three-dimensional terminal technology dealing with multimedia information the present invention can be applied to almost every industry and technology field such as broadcasting, home appliances/communications, education/information/training, entertainment, defense, semiconductor, computer/Internet commerce, medical service/life, aerospace, visual industry, culture, architecture and so on. Especially, the present invention can be applied as a viewing, observation, indication, diagnosis and measurement tool.

While the invention has been shown and described with respect to the preferred embodiments, it will be understood by those skilled in the art that various changes and modifications may be made without departing from the spirit and scope of the invention as defined in the following claims.

What is claimed is:

1. An apparatus for encoding multi-view video source data, comprising:
    preprocessing stage, when multi-view video source data is input, for eliminating from the input data a noise and solving an imbalancing problem;
    disparity prediction stage and motion prediction stage for estimating a disparity vector and a motion vector, respectively, on the basis of a moving picture axis including an I picture;
    disparity/motion compensation stage for compensating an image predicted by the disparity and the motion estimation stages by using a sub-pixel compensation technique;

residual image encoding stage for receiving an original picture from the preprocessing stage and a reconstructed picture provided from the disparity/motion compensation stage and performing a residual image encoding process in order to improve a picture quality and enhance a three-dimensional effect of the picture;

bit rate control stage for controlling a bit rate for each frame in a recovered picture encoded by the residual image encoding stage; and entropy encoding stage for generating bit streams for the multi-view moving picture source data according to the bit rates controlled by the bit rate control stage.

2. The apparatus of claim 1, wherein the preprocessing stage removes problems such as noise elimination and imbalancing by revising a reference image and an image to be revised through the mean and variance thereof.

3. The apparatus of claim 1, wherein the disparity/motion estimation stage sets up an estimated direction by using a multi-view disparity vector and a motion vector generated when the multi-view disparity vector is extended into moving picture.

4. The apparatus of claim 1, wherein the bit rate control controlled by the bit rate control stage uses a MPEG-2 bit rate control method, wherein a structure having one I picture inside a GGOP regards GGOP as one GOP and performs a bit rate control; a structure having two I pictures inside the GGOP performs a bit rate control by dividing GGOP into two parts including each one of I pictures; a structure having a C number of I pictures inside the GGOP is considered to have the C number of MPEG-2 moving picture and controls a bit rate on each separately, the C is positive integer.

5. The apparatus of claim 1, wherein the bit streams are constituted with a main bit stream and an auxiliary bit stream, the main bit stream having a same structure with MPEG-2 bit stream for the moving picture on the time axis having the I picture in order to be compatible with MPEG-2, and the auxiliary bit stream including data for processing multi-view moving picture on the time axis having no I picture.

6. The apparatus of claim 5, wherein the auxiliary bit stream includes a position and the number of I pictures, the number of views, a disparity vector and a motion vector of a view axis having no I picture, residual image encoding information and additional information.

7. The apparatus of claim 5, wherein the main bit stream is divided into a sequence layer that is a structure of MPEG-2, a GOP layer, a picture layer, a slice layer, a macro block layer and a block layer for compatibility with MPEG-2.

8. The apparatus of claim 6, wherein the auxiliary bit stream is inserted a sequence header, a sequence extension header, a picture header and a picture extension header with maintaining a structure of MPEG-2 to thereby distinguish data corresponding to multi-view moving picture source from data suitable for a MEPG-2 specification by applying a constrained parameters flag to a sequence header of MPEG-2.

9. The apparatus of claim 8, wherein the constrained parameters flag is a flag for distinguishing MPEG-1 from MPEG-2, but in multi-view moving picture encoder the constrained parameters flag becomes a flag for determining whether data to be processed is a multi-view moving picture signal or MPEG-2 moving picture.

10. The apparatus of claim 9, if the flag is set up as '0', the data to be processed is the multi-view moving picture and if the flag is set up as '1', the data to be processed is MPEG-2 moving picture and a reference frame number of the flag indicating a number of multi-view moving picture is inserted into the sequence extension header.

11. The apparatus of claim 10, wherein the reference frame number indicates the number of I pictures.

12. The apparatus of claim 11, wherein the reference frame position that is a flag for designating a position corresponding to a view and a time axis is inserted into a position of the I picture and, when a picture encoding type of the picture is a P picture and a B picture, information for distinguishing a picture encoding type using a disparity vector or a motion vector is added.

13. The apparatus of claim 12, in case of the P picture, other values are assigned to distinguish the disparity vector or the motion vector and a search range on the disparity vector is set up by additionally inserting the search range of the disparity vector into the motion vector search range in the picture extension layer; a disparity horizontal code that is a flag for designating a horizontal search range of the disparity vector and a disparity vertical code for designating the vertical search range of the disparity vector are added.

14. The apparatus of claim 1, a structure having one I frame inside the GGOP and a structure having two I frames inside the GGOP are used in order to effectively apply multi-view moving picture according to a size of the disparity vector generated by a camera parameter for obtaining the multi-view moving picture, wherein the multi-view moving picture structure having a small disparity vector is encoded by using the structure having one I frame and the multi-view moving picture having a big disparity vector is encoded by the structure having two I frames so that an error caused by the disparity vector estimation process is reduced and when generating a certain number of MPEG-2 structure bit streams, apart from the disparity vector, I frame uses the certain number of structures.

* * * * *